(12) United States Patent
Eriksen et al.

(10) Patent No.: US 6,722,927 B1
(45) Date of Patent: Apr. 20, 2004

(54) ELECTRICAL CONNECTOR FOR A PRESSURE SENSOR STEM

(75) Inventors: Christopher L. Eriksen, Saint Paul, MN (US); James L. Gravel, Prior Lake, MN (US); Randall C. Olson, Prior Lake, MN (US); David Strei, Waconia, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/446,457

(22) Filed: May 28, 2003

(51) Int. Cl.[7] ............................ H01R 13/405; G01L 7/00
(52) U.S. Cl. ......................................... 439/736; 73/756
(58) Field of Search ........................ 439/736, 733.1, 439/625, 752; 73/756

(56) References Cited

U.S. PATENT DOCUMENTS

| | | | |
|---|---|---|---|
| 6,089,097 A | 7/2000 | Frick et al. ............ | 73/718 |
| 6,199,575 B1 * | 3/2001 | Widner ............ | 137/227 |
| 6,267,418 B1 * | 7/2001 | Hogue et al. ............ | 285/331 |
| 6,508,129 B1 | 1/2003 | Sittler ............ | 73/756 |
| 2001/0008090 A1 * | 7/2001 | Murai et al. ............ | 73/756 |
| 2002/0062697 A1 * | 5/2002 | Yamagishi et al. ............ | 73/715 |
| 2002/0098730 A1 * | 7/2002 | Babala et al. ............ | 439/248 |
| 2002/0100333 A1 | 8/2002 | Gravel et al. ............ | 73/756 |
| 2003/0005773 A1 * | 1/2003 | Scholz et al. ............ | 73/717 |

* cited by examiner

Primary Examiner—Michael C. Zarroli
(74) Attorney, Agent, or Firm—Westman, Champlin & Kelly

(57) ABSTRACT

An electrical connector protects a pressure sensor stem that protrudes from a pressure sensor capsule. The electrical connector includes a baseplate with a central hole and a peripheral wall joined to the baseplate and protruding below the baseplate. The peripheral wall slidingly engages the pressure sensor capsule as the pressure sensor stem passes through the central hole to protrude above the baseplate. A protective wall joined to the baseplate protrudes above the pressure sensor stem and protects the pressure sensor stem. A lead frame in the protective wall provides electrical connections to sensor contact pads on the pressure sensor stem.

12 Claims, 7 Drawing Sheets

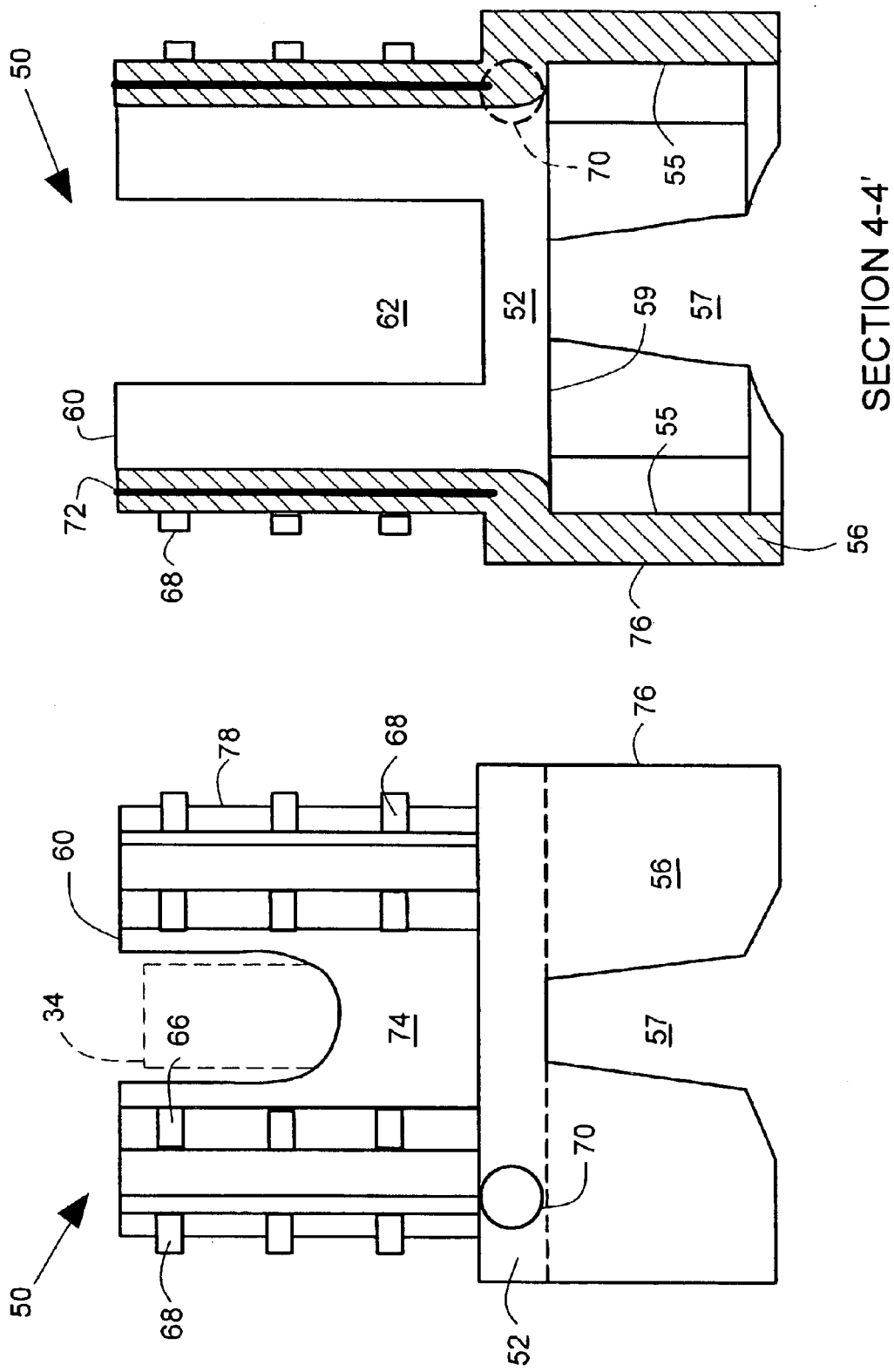

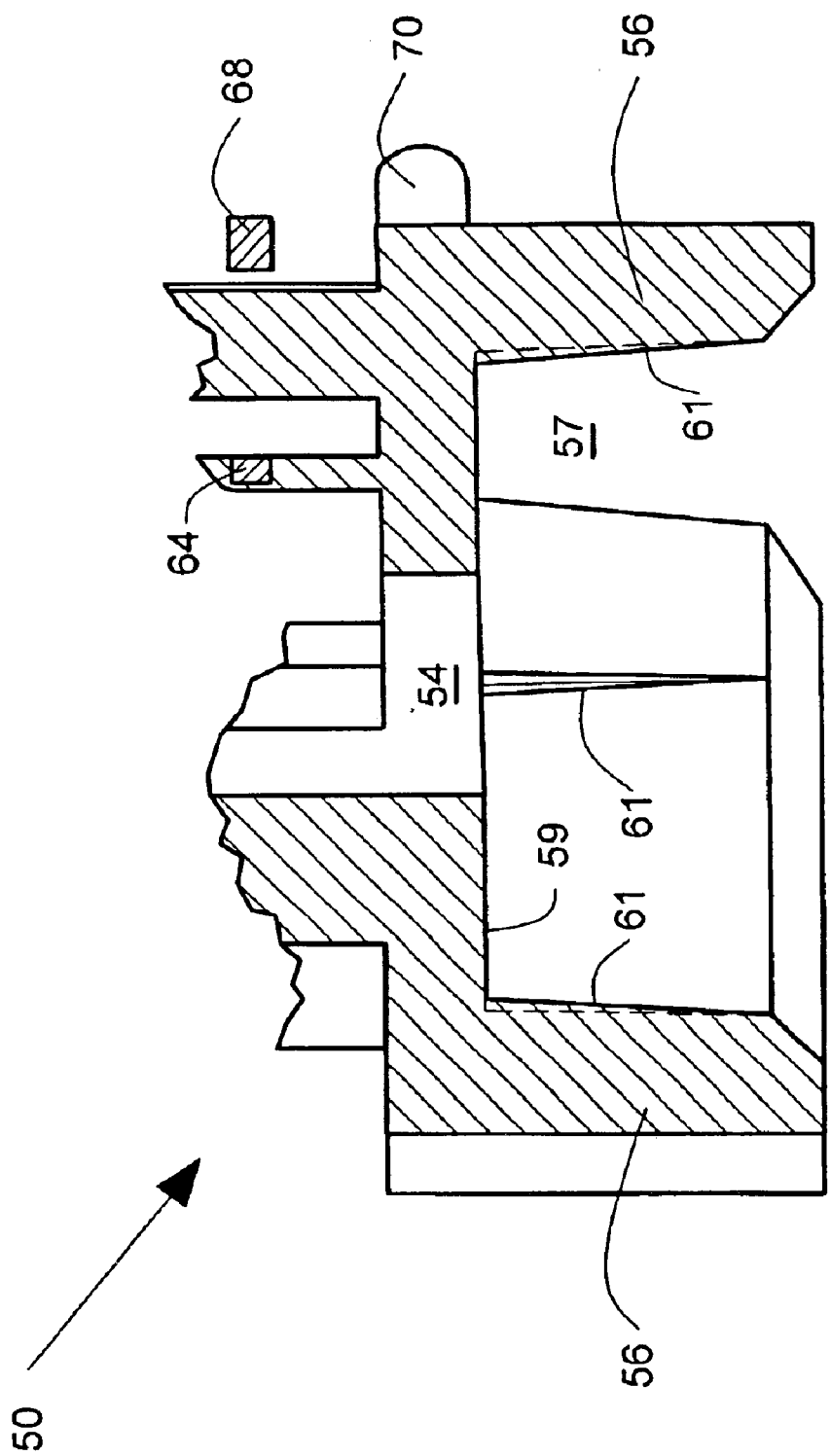

ELECTRICAL CONNECTOR FOR A PRESSURE SENSOR STEM

FIELD OF THE INVENTION

The present invention relates to pressure sensors for use in sensing pressure in fluids. In particular, the present invention relates to electrical connectors for pressure sensor components.

BACKGROUND OF THE INVENTION

Industrial transmitters are used to sense fluid parameters such as pressure, temperature, flow, and pH, and to transmit the value of the sensed fluid parameter to a remote location such as a control system. These transmitters can include a microminiature pressure sensor that is mounted in a pressure sensor capsule inside the transmitter. Such a pressure sensor may have a sensor stem that protrudes from the sensor capsule to provide access to electrical contact pads for bonding. The sensor stem is typically formed of brittle material such as sapphire and is easily broken by contact with tools or other objects during manufacture of the transmitter. The bond wires that are bonded to the electrical contact pads are also very delicate and subject to breakage at the point of connection.

An arrangement is needed for easy, reliable electrical connection from electrical contact pads on the sensor stem to bond wires. Such an arrangement also preferably protects the sensor stem from breakage.

SUMMARY OF THE INVENTION

Disclosed is an electrical connector that protects a pressure sensor stem that protrudes from a pressure sensor capsule. The electrical connector includes a baseplate with a central hole therethrough.

The electrical connector also includes a peripheral wall that is joined to the baseplate. The peripheral wall protrudes below the baseplate. The peripheral wall is shaped to slidingly engage the pressure sensor capsule as the pressure sensor stem passes through the central hole to protrude above the baseplate.

The electrical connector includes a protective wall joined to the baseplate. The protective wall protrudes above the pressure sensor stem. When the electrical connector is in place on the pressure sensor capsule, the protective wall protects the pressure sensor stem. A lead frame in the protective wall provides electrical connections to sensor contact pads on the pressure sensor stem.

BRIEF DESCRIPTION OF THE DRAWINGS

FIG. 3 illustrates a front view of the electrical connector.

FIG. 4 illustrates a front cross-section view of the electrical connector taken along line 4–4' in FIG. 5.

FIG. 7 illustrates a partial oblique cross-sectional view of the electrical connector, taken along line 7–7' in FIG. 6.

DETAILED DESCRIPTION OF THE ILLUSTRATED EMBODIMENTS

In the embodiments illustrated below, an electrical connector has a peripheral wall that is shaped to slide onto an end of a pressure sensor capsule and a protective wall that is shaped to protrude above a brittle pressure sensor stem and protect the pressure sensor stem from damaging contact with foreign objects during handling. The peripheral wall and the protective wall are joined together at a baseplate that provides a positive stop to ensure correct alignment with the pressure sensor capsule. A lead frame in the protective wall provides electrical connections to sensor contact pads on the pressure sensor stem. The electrical connector is preferably formed by injection molding plastic resin and includes a metal insert that serves as an RFI/EMI shield. An arrangement of an exemplary pressure sensor capsule is described below in connection with FIG. 1 and an arrangement of an exemplary electrical connector is described below in connection with FIGS. 2–7.

Figure 1:
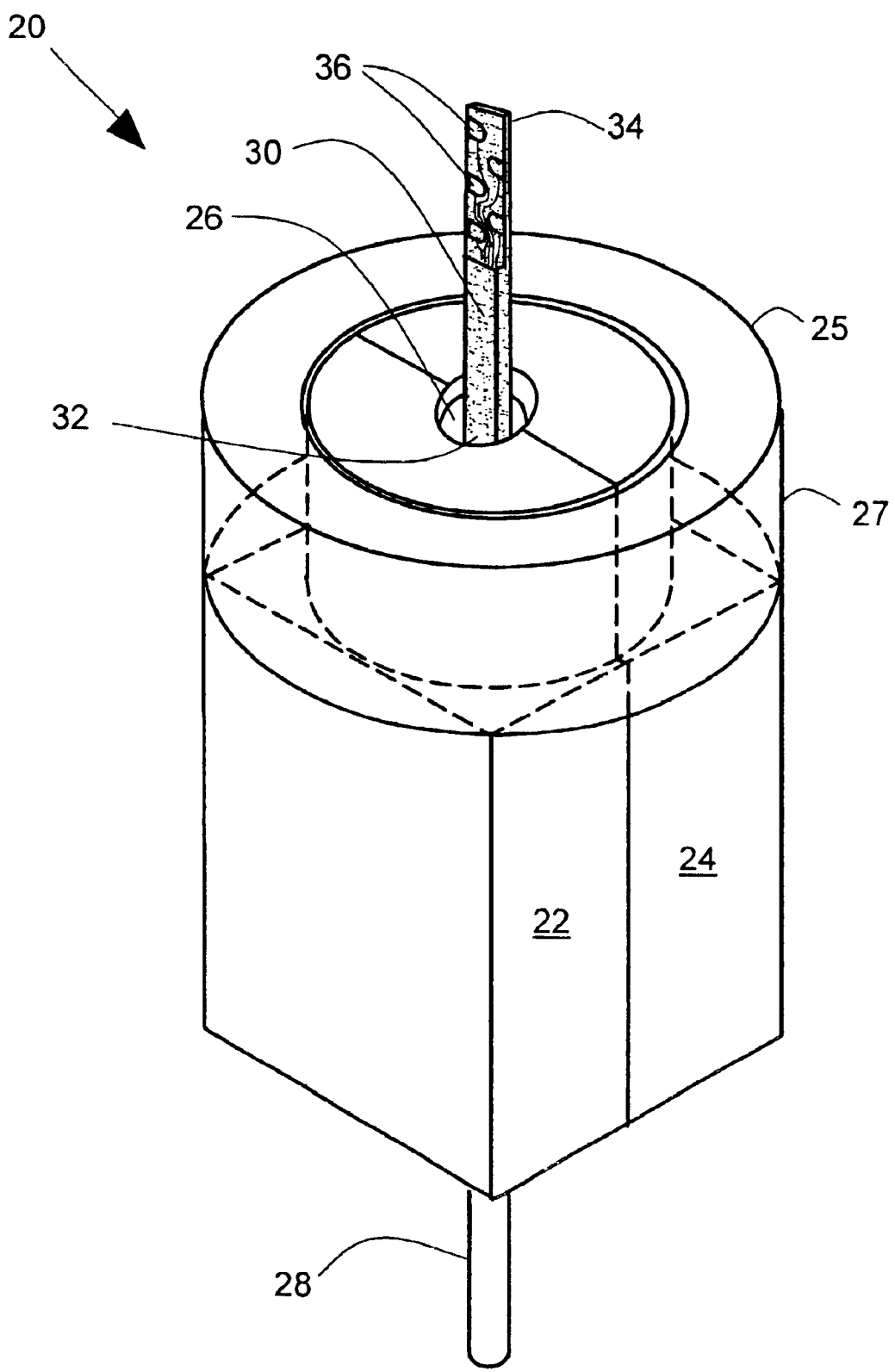
FIG. 1 illustrates an isometric view of a pressure sensor capsule with a protruding pressure sensor stem.

FIG. 1 illustrates an oblique view of one example of a pressure sensor capsule 20. In such an embodiment, the pressure sensor capsule 20 includes a block that is made of two block halves 22, 24 that are joined together to form a sensor mounting hole 26. A fluid inlet tube 28 provides pressurized fluid to a pressure chamber (not illustrated) inside the block. A support ring 25 with a cylindrical outer surface 27 improves the pressure integrity of the pressure sensor capsule 20. A pressure sensor 30 has a neck 32 that passes through the mounting hole 26 and also has a pressure sensitive portion (not illustrated) inside the pressure chamber. The pressure sensor 30 also includes a pressure sensor stem 34 that protrudes out of the pressure sensor capsule 20. The pressure sensor stem 34 includes sensor contact pads 36 for making electrical connections to the pressure sensor 30. It is appreciated that the pressure sensor 30 may take a variety of forms as long as it includes a stem portion extending through a mounting hole for electrical connections.

The pressure sensor capsule 20 and pressure sensor 30 can be constructed, for example, as described in U.S. Pat. No. 6,089,097 Frick et al., U.S. Pat. No. 6,508,129 Sittler or U.S. Patent Application Publication 20020100333 Gravel et al.

The pressure sensor 30 may be formed of brittle material such as alumina (synthetic sapphire), silicon or quartz glass. One potential problem is that when the pressure sensor stem 34 comes in contact with a foreign object, sufficient force can be applied by the foreign object to break the neck 32. The brittle material is resistant to bending and there is a stress concentration where the neck 32 joins the sensor mounting hole 26 that is prone to breakage during normal handling that occurs during manufacturing processes. In one embodiment, the sensor contact pads 36 are extremely small, on the order of about 0.64 mm (0.025 inch) and extremely fine bond wires with diameters about 0.025 mm (0.001 inch) are used to make contact with the contact pads 36. The bond wires are subject to flexing and breaking during normal handling in manufacturing processes. Problems with breakage of the neck 32 of the pressure sensor 30 and breakage of the bond wires are avoided by an exemplary electrical connector described below in connection with FIGS. 2–7.

Figure 2:
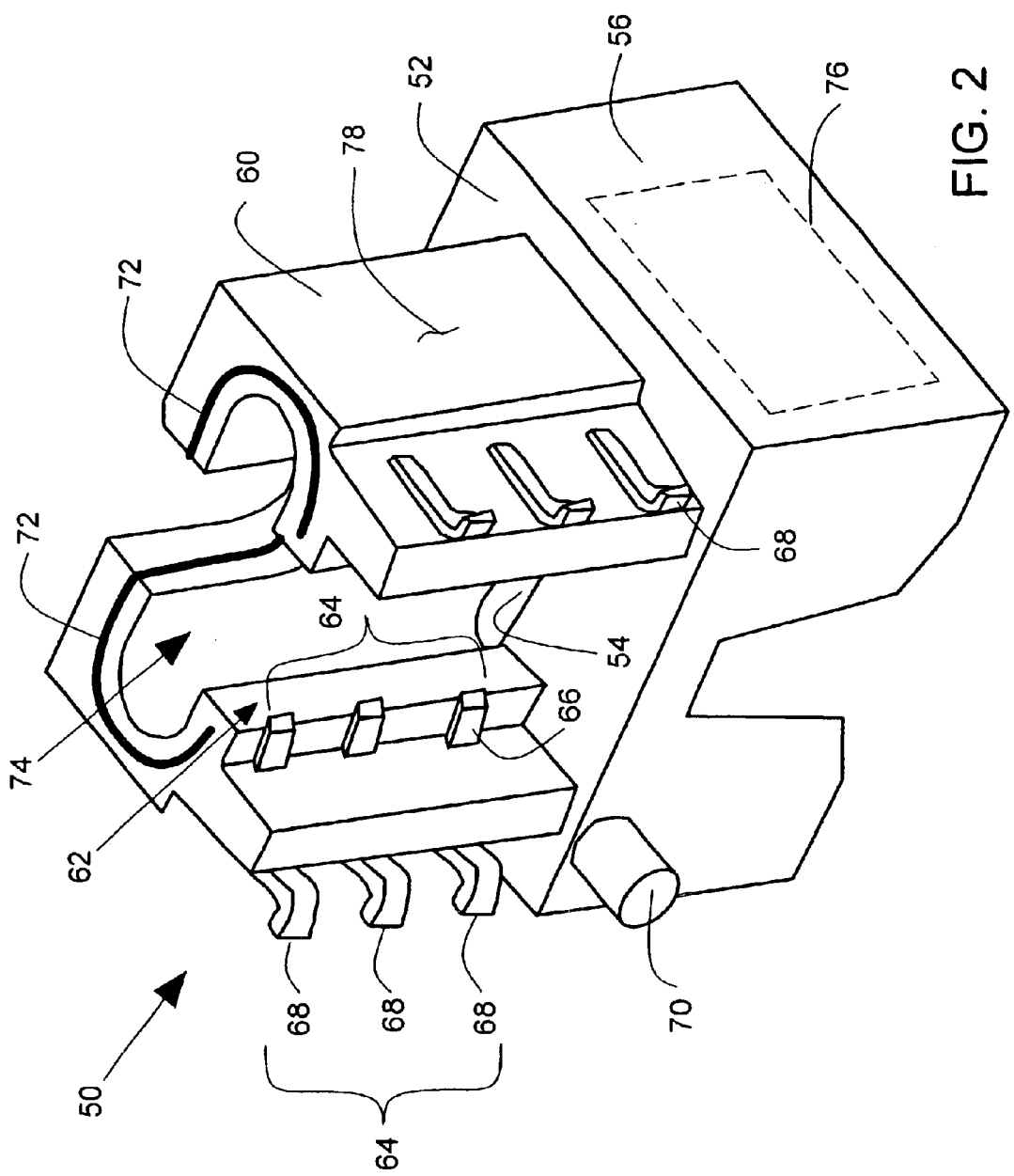
FIG. 2 illustrates an oblique view of an electrical connector.
Figure 6:
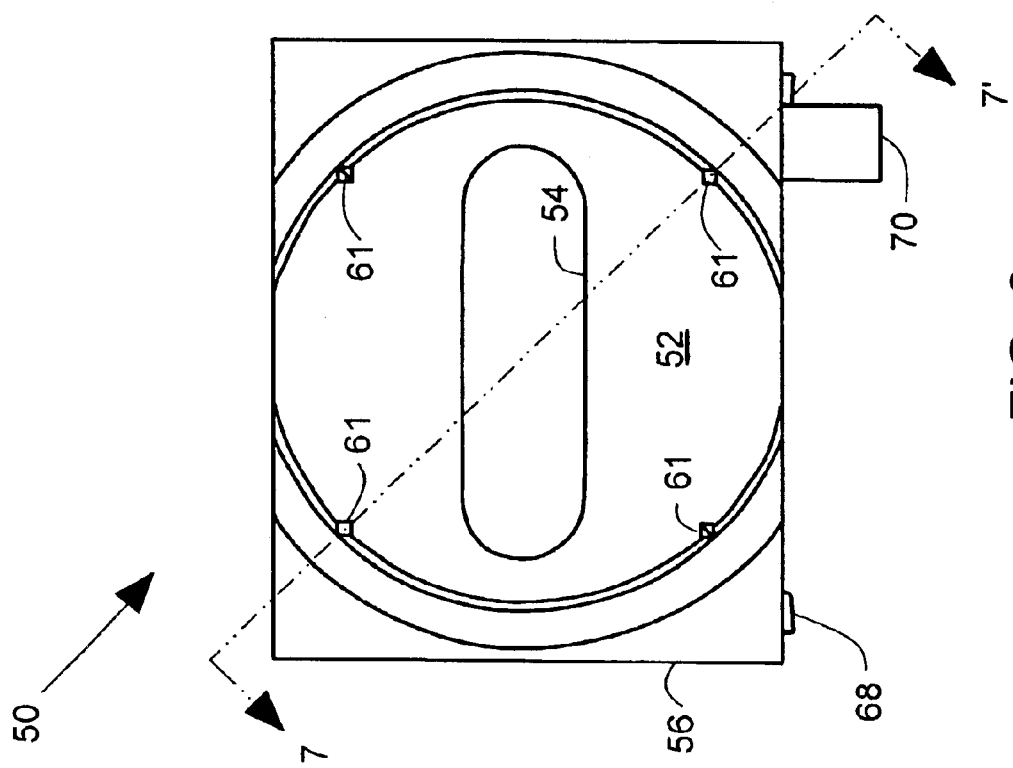
FIG. 6 illustrates a bottom view of the electrical connector.
Figure 5:
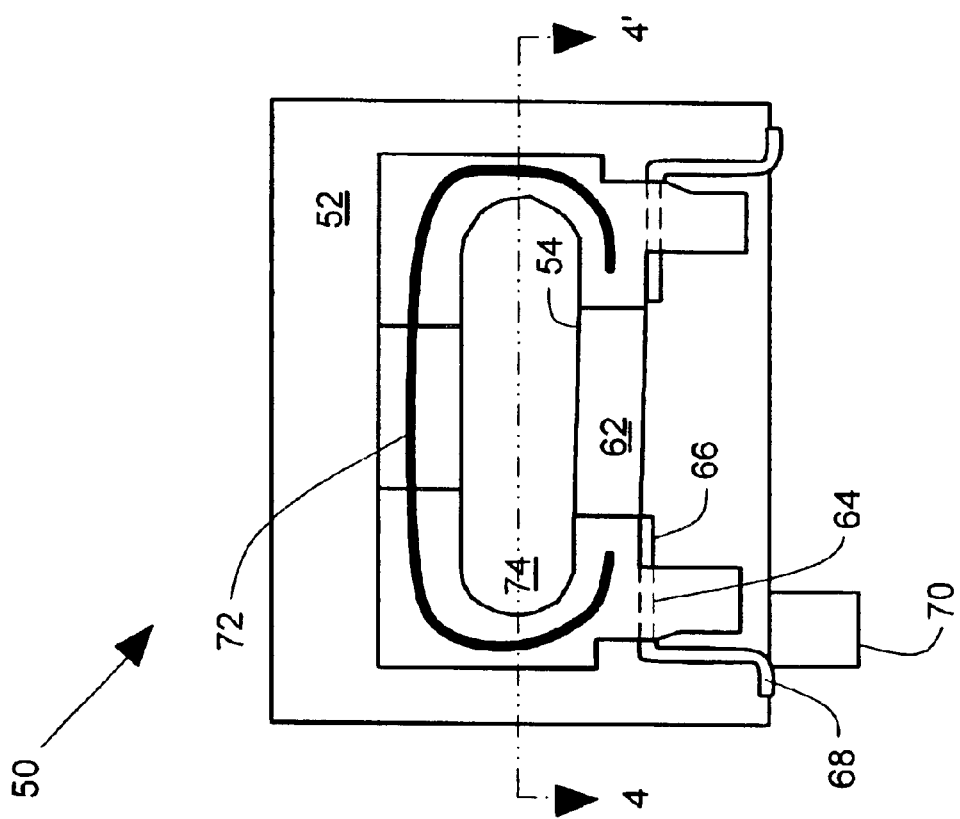
FIG. 5 illustrates a top view of the electrical connector.

FIG. 2 illustrates an oblique view of an electrical connector 50. The electrical connector 50 can be used to protect a pressure sensor stem (such as stem 34 in FIG. 1) that protrudes from a pressure sensor capsule (such as capsule 20 in FIG. 1). Certain aspects of the electrical connector 50 can be seen more clearly in a front view (FIG. 3), a front cross-sectional view (FIG. 4 taken along line 4–4' in FIG. 5), a top view (FIG. 5), a bottom view (FIG. 6), or a partial oblique sectional view (FIG. 7 taken along line 7–7' in FIG. 6). The same reference numbers are used consistently throughout FIGS. 2–10 to designate the various features.

The electrical connector 50 shown in FIGS. 2–7 comprises a baseplate 52 with a central hole 54 passing through the baseplate 52. The electrical connector 50 also includes a peripheral wall 56 joined to the baseplate 52 and protruding below the baseplate 52 as illustrated. The peripheral wall 56 is shaped to slidingly engage a surface of a pressure sensor capsule (such as surface 27 of capsule 20 in FIG. 1) as the pressure sensor stem (such as stem 34) passes through the central hole 54 to protrude above the baseplate 52. An underside 59 (FIGS. 4,7) of baseplate 52 and interior surfaces 55 (FIG. 4) of peripheral wall 56 preferably form a generally cylindrical cavity 57 (FIGS. 3,4) that fits an outer surface of a support ring (such as surface 27 in FIG. 1). The underside 59 serves as positive stop for positioning the protective device 50 on a pressure sensor capsule.

The electrical connector 50 further comprises a protective wall 60 joined to the baseplate 52 and protruding above the pressure sensor stem 34 (FIG. 3). The protective wall 60 protects the pressure sensor stem 34 from inadvertent impact with a foreign object. The protective wall 60 positions the electrical surface mount contacts 68 for easy bonding to a circuit board without any danger of disturbing sensor wire bonds at bonding pads 66. The sensor wire bonds can be completed at the packaged pressure sensor level of assembly, and then the circuit board level of assembly can be completed later without the difficult of making wire bonds. The bond wires are extremely short and provide a robust resistance to damage from shock and vibration in the operating environment.

The baseplate 52, the peripheral wall 56 and the protective wall 60 preferably comprise an injection molded part formed of plastic resin. The pressure sensor stem (such as stem 34 in FIGS. 1, 3) has sensor contact pads (such as pads 36 in FIG. 1) and the protective wall 60 preferably comprises a slot 62 aligned with the sensor contact pads. The slot 62 allows access to the sensor contact pads for bonding of bond wires from the contact pads 36 (FIG. 1) to the bonding pads 66.

The electrical connector 50 preferably comprises a metal lead frame 64 molded in the protective wall 60 adjacent the slot 62. The lead frame 64 includes multiple bonding pads 66 adapted to bond to bond wires joined to the sensor contact pads 36. The lead frame 64 is arranged in a dual in-line package (DIP) pattern as illustrated and includes multiple protruding surface-mount (SM) contacts 68. The arrangement with the lead frame 64 allows bond wires to be installed in a location that is protected from contact with foreign objects. The arrangement with the lead frame 64 also prevents flexing of the bond wires. Any lead flexing required by installation in a pressure transmitter is transferred to the more rugged surface mount contact 68. The lead frame 64 places the bond pads 66 in close proximity to the sensor contact pads 36, allowing for short, robust wire bonds.

The electrical connector 50 preferably comprises an alignment pin 70 that is joined to the baseplate 52 and protrudes adjacent the protruding surface mount contacts 68. The alignment pin 70 preferably fits into an alignment hole on a circuit board (not illustrated) to better align the surface mount contacts 68 with solder pads on the circuit board. The electrical connector 50 preferably includes an RFI protective shield 72 molded into the protective wall 60. In one preferred arrangement, the alignment pin 70 is formed of metal and serves as a connection between the RFI protective shield 72 and a grounding pad on the circuit board.

The peripheral wall 56 preferably includes gripping surfaces 61 (FIGS. 6,7) that are shaped to grip a surface (such as surface 27 in FIG. 1) of the pressure sensor capsule. The gripping surfaces preferably have a tapered shape as illustrated. The tapered shaped causes the surface 27 to compress the gripping surfaces 61 and form an interference fit that resists removal of the protective device 50. The gripping surfaces 61 also resist rotation of the protective device 50 on the surface 27.

The protective wall 60 is preferably shaped to form a potting cavity 74 around the pressure sensor stem. The potting cavity 74 is shaped for filling with a potting compound so that the stem 34 and the bond wires can be potted in the potting cavity 74 for further protection.

If desired, a surface such as component mounting surface 76 (FIG. 2) can be used for mounting a miniature electronic circuit that connects to the bonding pads 64.

The baseplate 52 preferably extends peripherally outward from the protective wall 60 as illustrated, and the protective wall 60 has external surfaces 78 that can be used to engage a mounting hole (not illustrated) into which the electrical connector 50 is inserted.

An electrical connector, such as electrical connector 50 solves problems with lead breakage and sensor stem breakage and provides an assembly with the pressure sensor capsule 20 that can be conveniently handled in a production environment without undue breakage of electrical bond wires or the sensor stem.

Figure 8:
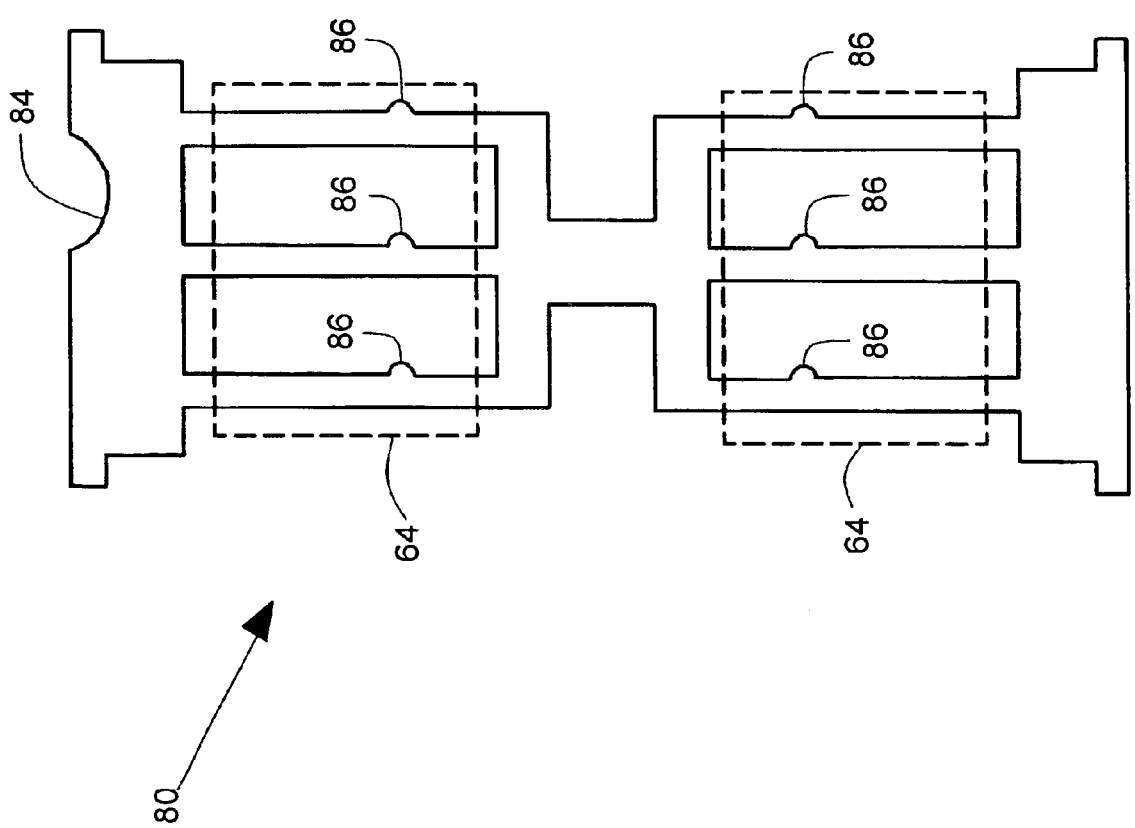
FIGS. 8–10 illustrate a lead carrier arrangement useful in positioning a lead frame in an electrical connector.
Figure 10:
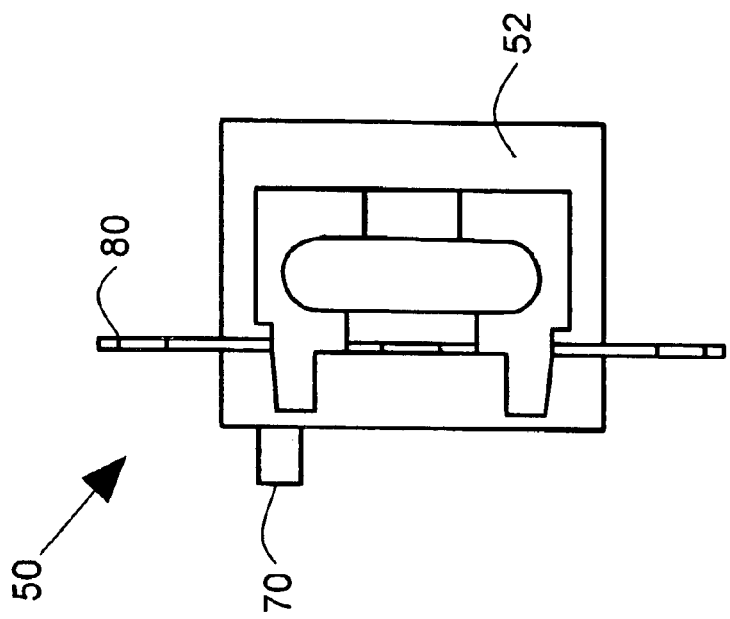
Figure 9:
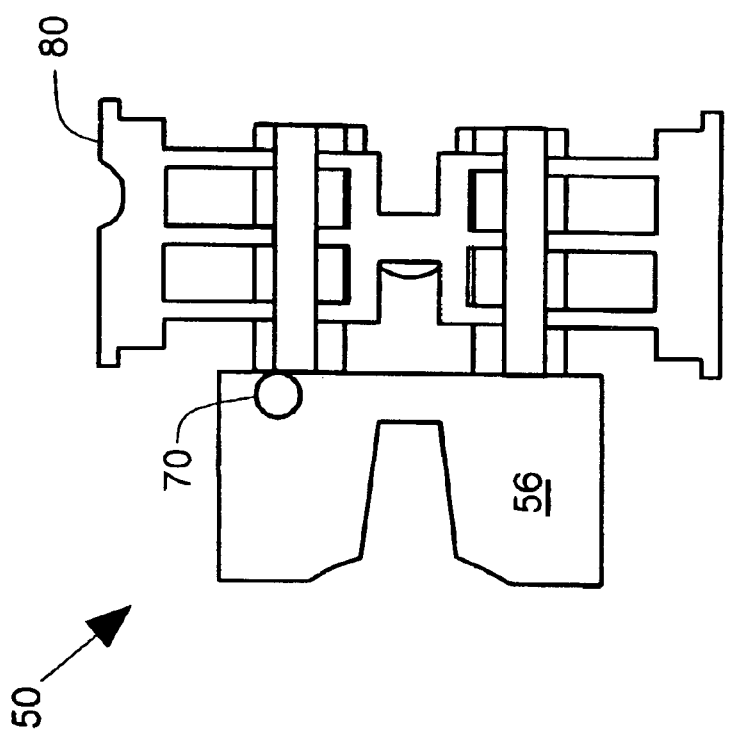

FIGS. 8–10 illustrate a lead carrier arrangement 80 useful in positioning a lead frame 64 in a mold (not illustrated). The lead frame 64 is a part of the lead carrier arrangement 80 that is cut free of the main body of the lead carrier arrangement 80 after the molding is complete and the leads have been bent into final shape. As illustrated in FIG. 8, the lead carrier arrangement 80 includes a notch 84 for alignment in the mold. The lead carrier arrangement 80 holds each lead in a predetermined position in the mold to ensure correct alignment with a plastic resin molding. Each lead in the lead frame 64 includes a protruding tab 86 that prevents the lead from sliding in the molded part during bending operations. The protruding tabs 86 are preferably molded inside the protective wall 60. FIG. 9 illustrates a front view and FIG. 10 illustrates a top view of the lead carrier arrangement 80 secured in the electrical connector 50, after molding is complete, but before bending of the lead frame 64 and before cutting the lead frame 64 away from the lead carrier arrangement 80. The lead carrier arrangement 80 is preferably a stamped, etched or laser machined sheet metal component.

Although the present invention has been described with reference to preferred embodiments, workers skilled in the art will recognize that changes may be made in form and detail without departing from the scope of the invention. While the embodiments illustrated show a lead frame of separate leads, it will be understood by those skilled in the art that a lead frame comprising a flexible circuit can also be used and connected directly to contact pads on the sensor stem, eliminating the need for bond wires to the sensor pads.

What is claimed is:

1. An electrical connector for connection to a pressure sensor stem that protrudes from a pressure sensor capsule, the electrical connector comprising:

a baseplate with a central hole therethrough;

a peripheral wall joined to the baseplate and protruding below the baseplate, the peripheral wall being shaped to slidingly engage the pressure sensor capsule as the pressure sensor stem passes through the central hole to protrude above the baseplate;

a protective wall joined to the baseplate to protrude above the pressure sensor stem, the protective wall protecting the pressure sensor stem; and a lead frame disposed in the protective wall providing electrical connections to sensor contact pads on the pressure sensor stem.

2. The electrical connector of claim 1 wherein the baseplate, the peripheral wall and the protective wall comprise plastic resin.

3. The electrical connector of claim 1 wherein the pressure sensor stem has sensor electrical contact pads and the protective wall comprises a slot aligned with the sensor contact pads.

4. The electrical connector of claim 3 wherein the lead frame is molded in the protective wall adjacent the slot.

5. The electrical connector of claim 4 wherein the lead frame includes bonding pads adapted to bond to bond wires joined to the sensor contact pads.

6. The electrical connector of claim 4 wherein the lead frame is arranged in a dual in-line package (DIP) pattern and includes protruding surface-mount (SM) contacts.

7. The electrical connector of claim 6 further comprising an alignment pin that is joined to the baseplate and protrudes adjacent the protruding surface mount contacts.

8. The electrical connector of claim 1 further comprising an RFI protective shield molded into the protective wall.

9. The electrical connector of claim 1 wherein the peripheral wall includes gripping surfaces that are shaped to grip the pressure sensor capsule.

10. The electrical connector of claim 1 wherein the protective wall forms a potting cavity around the pressure sensor stem, the potting cavity being shaped for filling with a potting compound.

11. The electrical connector of claim 1 further comprising a component mounting surface shaped for mounting an electronic circuit.

12. The electrical connector of claim 1 wherein the baseplate extends peripherally from the protective wall, and the protective wall has external surfaces adapted for insertion in a mounting hole.

* * * * *